United States Patent
Kuo et al.

(10) Patent No.: US 8,606,058 B2
(45) Date of Patent: Dec. 10, 2013

(54) MULTI-CHANNEL OPTICAL COUPLER

(75) Inventors: Huei Pei Kuo, Cupertino, CA (US); Michael Renne Ty Tan, Menlo Park, CA (US); Robert G. Walmsley, Palo Alto, CA (US); Shih-Yuan (SY) Wang, Palo Alto, CA (US); Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 12/433,794

(22) Filed: Apr. 30, 2009

(65) Prior Publication Data

US 2010/0278478 A1 Nov. 4, 2010

(51) Int. Cl.
*G02B 6/26* (2006.01)

(52) U.S. Cl.
USPC .................................. 385/24; 385/31

(58) Field of Classification Search
USPC .................. 385/24, 31, 43–45, 47–50
See application file for complete search history.

(56) References Cited

U.S. PATENT DOCUMENTS

| | | |
|---|---|---|
| 4,449,783 A | 5/1984 | Witte |
| 4,484,794 A | 11/1984 | Witte |
| 4,590,619 A | 5/1986 | Winzer |
| 4,726,643 A | 2/1988 | Imoto et al. |
| 4,786,131 A | 11/1988 | Mahapatra et al. |
| 4,836,644 A | 6/1989 | Eisenmann et al. |
| 4,950,045 A | 8/1990 | Bricheno et al. |
| 5,129,018 A | 7/1992 | Poisel et al. |
| 5,379,354 A | 1/1995 | Jenkins |
| 5,396,570 A | 3/1995 | Jenkins et al. |
| 5,410,625 A | 4/1995 | Jenkins et al. |
| 5,475,776 A | 12/1995 | Jenkins et al. |
| 5,600,742 A | 2/1997 | Zimgibl |
| 5,636,300 A | 6/1997 | Keck et al. |
| 5,745,618 A | 4/1998 | Li |
| RE36,471 E | 12/1999 | Cohen |
| 6,415,072 B1 | 7/2002 | Hashizume et al. |
| 7,016,568 B2 * | 3/2006 | Van Weerden et al. ......... 385/37 |
| 7,054,523 B2 | 5/2006 | Takahashi et al. |
| 7,266,277 B2 | 9/2007 | Hamada |
| 7,266,278 B2 | 9/2007 | Iwasaki |
| 2006/0002658 A1 * | 1/2006 | Watanabe ....................... 385/43 |

OTHER PUBLICATIONS

Fuji Xerox Co., Ltd, Optical Sheet Bus Technology, www.fujixerox.com/eng/company/technology/osb/, taken from website 3/27/209.
Funada, et al., Proposal of novel optical bus system using optical sheet bus technology, http://cat.inist.fr/?aModele=afficheN&cpsidt+1827499, taken from website 3/27/209.

* cited by examiner

*Primary Examiner* — Kevin S Wood (57) ABSTRACT

A solid core, multi-channel optical coupler comprising an elongate mixer body having an input end, an output end and sidewalls forming a length of the mixer body, where the input end is configured for coupling to a plurality of input channels providing an optical signal for transmission through the mixer body, and a plurality of output tapers coupled to the output end. Each of the output tapers has a reception area adjacent the output end of the mixer body for receiving a portion of the optical signal transmitted through the mixer body. Furthermore, the reception area of each output taper is variable to vary the intensity of the optical signal received by the output taper.

20 Claims, 5 Drawing Sheets

┌─ 252
Coupling an optical signal into a multi-channel optical coupler
including an elongate solid core mixer body having an input end,
an output end and sidewalls forming the length of the mixer body.

┌─ 254
Diffusing the optical signal over the length of the mixer body
to a uniform intensity across the output end.

┌─ 256
Receiving the diffused optical signal into a plurality of output tapers
coupled to the output end, each of the output tapers having
a reception area adjacent the output end of the mixer body
for receiving a portion of the diffused optical signal.

┌─ 258
Distributing the diffused optical signal into a plurality of
output channels coupled to the output tapers, wherein
the intensity of each distributed optical signal is proportional
to the reception area of its respective output taper.

*FIG. 8*

MULTI-CHANNEL OPTICAL COUPLER

BACKGROUND

As the information technology marketplace continues to push computers and networking systems towards ever greater performance, optical networks are being developed to handle the increased speeds and to provide the greater bandwidth necessary for moving large amounts of data. Interconnecting the optical fibers and waveguides forming these advanced networks continues to be a challenging due to limitations in existing optical couplers that are used to combine optical signals from several light sources and to redistribute the combined signals to multiple output channels and/or detectors.

New devices and methods are needed to provide more flexibility, and hence efficiency, in routing optical signals between optical fibers or waveguides, and that allow for the number (N) of input channels to be different than the number (M) of output channels.

BRIEF DESCRIPTION OF THE DRAWINGS

FIG. 7b illustrates a cross-sectional plan view of an optical coupler with an index-matching fluid, in accordance with the embodiment of FIG. 7a.

DETAILED DESCRIPTION

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made to the invention without departing from the spirit and scope of the present invention. As such, the following detailed description is not intended to limit the scope of the invention as it is claimed, but rather is presented for purposes of illustration, to describe the features and characteristics of the representative embodiments and to sufficiently enable one skilled in the art to practice the invention. Accordingly, the scope of the present invention is to be defined solely by the appended claims.

A multi-channel optical coupler system and method for splitting or re-distributing one or more optical signals between multiple output channels is described herein. The optical coupler can be a passive, solid core optical coupler comprising an elongate mixer body having an input end, an output end and sidewalls forming a length of the mixer body. The mixer body can include a solid core surrounded by a cladding layer with both the solid core and the cladding layer formed from optically translucent materials having defined indexes of refraction. The index of refraction of the cladding layer can be substantially less than the index of refraction of the solid core to encourage total internal reflection of one or more optical signals traveling through the elongate mixer body. The solid core of the elongate mixer body can have a length that is substantially longer than either its cross-sectional height or cross-sectional width, so as to diffuse the one or more optical signals through total internal reflection along the length of the mixer to a uniform intensity across the output end.

The input end of the mixer body can be configured for coupling to a plurality of input channels ("N" number of inputs), at least one of which can be activated at any time to provide an optical signal for transmission through the mixer body. Moreover, additional input channels can also be activated at the same time to provide a plurality of optical signals that are simultaneously mixed as they pass through the mixer body.

The optical coupler can further comprise a plurality of converging output tapers coupled to the output end of the mixer body, which in turn can be coupled to an equivalent plurality of output channels ("M" number of outputs). Unlike many prior art optical couplers, the number of the output tapers or channels (M) can be derived or configured independently from the number of input channels (N), so that there can be more or fewer output channels than input channels.

In one aspect the output tapers can be separate bodies that are coupled to the output end of the mixer body with an index-matching adhesive, etc. In another aspect the output tapers can be formed integrally with the mixer body, so that the solid core of the mixer body seamlessly extends into the output tapers to provide a continuous pathway for the optical signal, albeit with a converging cross-sectional area in the vicinity of the output tapers.

Each of the output tapers can have a reception area positioned adjacent the output end for receiving a portion of the one or more optical signals being transmitted through the mixer body. In one aspect, the size of the reception area can be varied or adjusted to vary the intensity of the optical signal received by each output taper. For instance, the intensity of the optical signal received by each output taper can be increased by expanding the size of the reception area of a particular output taper. Conversely, the intensity can also be decreased by reducing the size of the reception area.

In another embodiment of the multi-channel optical coupler, diverging input tapers can be provided between the input channels and the input end of the mixer body. The input tapers can better control and guide the optical signal into the mixer body, or can convert a circular optical pathway (e.g. the input channel) into an optical pathway having a square or rectangular cross-sectional aspect corresponding to a portion of the input end of the mixer body. As with the converging output tapers, the diverging input tapers can be separate bodies that are coupled to the input end of the mixer body with an index-matching adhesive, or can be formed integrally with the mixer body, etc. Furthermore, both output and input tapers can be configured with sloped taper bodies having at least two sections with different slopes in order to match the optical conductance (or etendue) of the optical elements, and to improve the coupling efficiency between the optical pathway and the mixer body.

As can be appreciated, the multi-channel optical coupler provides several significant advantages over prior related optical couplers, some of which are recited here and throughout the following more detailed description. One such prior art optical coupler is the "star" coupler, which by reason of the manufacturing methods used to make the device requires that the number of inputs be equal to the number of outputs, and that the energy or intensity of the input signals be evenly split between all of the output channels. While fairly simple in design, the star coupler is limiting in that it cannot be optimized for any node of an optical network that employs a differing numbers of inputs and outputs, as there would either be an unused input channel taking up input real estate, or an unused output channel siphoning off unused signal energy. In contrast, the multi-channel optical coupler can couple any number of optical inputs to any number of optical outputs with a more efficient use of input space and without any optical energy being wasted in an unused output channel, providing much greater flexibility and efficiency when designing and installing an optical network.

The multi-channel optical coupler is also advantageous over hollow metal waveguide ("HMWG") optical couplers which use beam splitters at various locations along the length of the waveguide to sequentially split off a portion of the optical signal into a separate output channel. While the HMWG itself is low-cost to fabricate, the inserted beamsplitters are much more expensive and require precise control over both the fabrication of the beamsplitter and the alignment of the devices within the hollow metal waveguide. The optical coupler, by contrast, can be made from optically translucent materials that are both economical and readily available in the industry, and can be constructed using a variety of common manufacturing techniques including deposition, photolithography, mechanical or laser etching, etc., that lend themselves to high-volume, low-cost fabrication. Additionally, the solid core structure of the optical coupler can be less sensitive to errors in fabrication, alignment and/or installation, yielding a more fault-tolerant and robust device for splitting and redistributing optical input signals between multiple output channels.

The multi-channel optical coupler can provide a direct optical pathway between the input and output ends of the elongate mixer to carefully control the reflections off the sidewalls and maintain the luminance of the optical signal across the length of the elongate mixer. While other slab-like waveguide mixers available in the prior art use a reflective light-shaping diffuser at one end of the mixer body to reflect the optical signal back upon itself in order to diffuse the optical signal and shorten the length of the mixer, this can adversely spread the range of the angle of incidence of the optical signal contacting the boundaries of the mixer and adversely reduce the luminance of the optical signal. In the extreme, it causes some of the light to penetrate the boundary or cladding and exit the optical coupler as wasted energy. In contrast, the elongate configuration of the mixer body can advantageously allow the input signals to be completed diffused across the cross-sectional area of the output end while maintaining the luminance and with a minimal amount of loss of energy along the length of the elongate mixer. Moreover, the output tapers (as well as the optional input tapers) can be used to further converge or focus the optical signal, e.g., to match the area of optical detectors, while substantially maintaining the luminance of the optical signal and minimizing losses.

Each of the above-recited advantages will be apparent in light of the detailed description set forth below and best understood with reference to the accompanying drawings, wherein the elements and features of the invention are designated by numerals throughout. These advantages are not meant to be limiting in any way. Indeed, one skilled in the art will appreciate that other advantages may be realized, other than those specifically recited herein, upon practicing the present invention.

Figure 1:
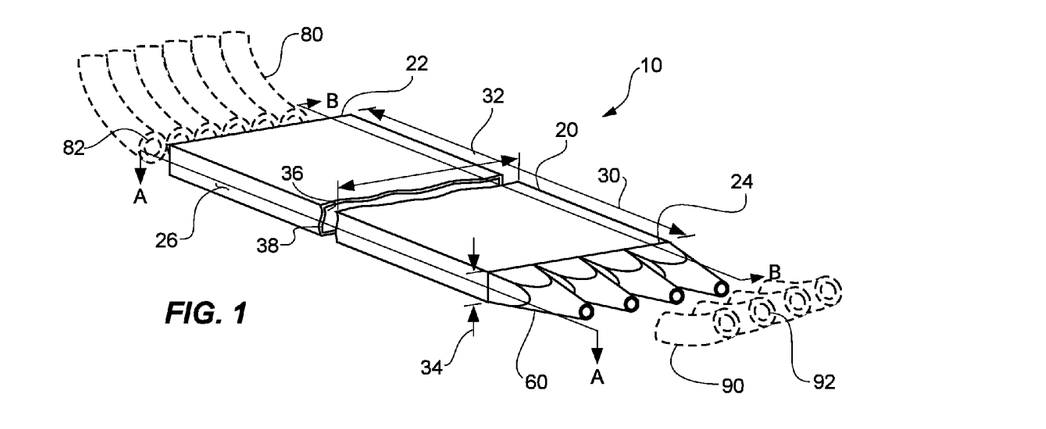
FIG. 1 illustrates a perspective view of a multi-channel optical coupler, in accordance with one representative embodiment.

Illustrated in FIG. 1 is a perspective view of a multi-channel optical coupler 10, in accordance with one representative embodiment. The optical coupler can be a passive, solid core optical coupler comprising an elongate mixer body 20 having an input end 22, an output end 24 and sidewalls 26 (further defined as the sides, top and bottom of the mixer body) forming a length 30 of the mixer body. The mixer body can include a solid core 36 surrounded by a cladding layer 38, with both the solid core formed from optically translucent materials having defined indexes of refraction. The cladding layer can be either translucent or opaque. The index of refraction of the cladding layer 28 can be substantially less than the index of refraction of the solid core 36 to encourage total internal reflection of one or more optical signals traveling through the elongate mixer body. Additionally, it may also be advantageous to use an opaque cladding layer to help reduce stray light and cross talk from adjacent optical couplers or sources.

As illustrated in FIG. 1, the elongate mixer body 20 can have a rectangular cross-section that corresponds approximately in size to the dimensions of a row or ribbon of input optical channels 80 or output optical channels 90, such as optical fibers 82, 92, respectively. The elongate mixer body 20 can thus have the general shape of a rectangular slab or shoebox, and can be easily manufactured using the high-volume, low-cost fabrication techniques currently available in the art. The elongate mixer body 20 can also have a length 30 that is substantially longer than either its cross-sectional width 32 or cross-sectional height 34, so as to diffuse one or more transmitted optical signals through total internal reflection along the length of the mixer body to a uniform intensity across the surface of the optical core at the output end 24. In one representative embodiment, the length of the mixer body can be more than 10 times greater than the cross-sectional width of the mixer body. The one or more optical signals introduced into the input end 22 of the mixer body by the input channels 80 can also be configured with a numerical aperture ranging between 0.1 and 0.3. A focusing lens or similar device can be used to tailor the light signal and control its physical dimensions and numerical aperture prior to introduction into the mixer body 20.

Although the elongate mixer body 20 is shown in FIG. 1 with a thin and flattened rectangular cross-sectional aspect corresponding to a single row of optical channels, fibers or waveguides, etc., other configurations are also possible, including mixer bodies with square, round, hexagonal or octagonal cross-sectional aspects, etc, and in which the input 80 or output 90 optical channels are stacked vertically as well as horizontally. For example, an optical coupler having one input and eight outputs could be stacked (vertically or horizontally) twelve times to yield a 12:96 optical coupler or splitter. This device could thus accommodate twelve optical inputs in a single vertical or horizontal row, with each one splitting into eight outputs, resulting in output matrix with ninety-six total output signals.

The input end 22 of the mixer body can be configured for coupling to a plurality ("N"=number of inputs) of input channels 80, at least one of which can be activated at any moment in time to provide an optical signal for transmission through the mixer body 20. Moreover, additional input channels can also be activated at the same time to provide a plurality of optical signals that can be simultaneously mixed and transmitted through the mixer body.

The optical coupler can further comprise a plurality of converging output tapers 60 coupled to the output end 24 of the mixer body, which in turn can be coupled to a plurality ("M" number of outputs) of output channels 90. Unlike many prior art optical couplers, the number of the output tapers and channels (M) can be derived or configured independently from the number of input channels (N), so that there can be more or fewer output channels than input channels. In one aspect, the output tapers 60 can be separate bodies that are coupled to the output end of the mixer body with an index-matching adhesive, etc. In another aspect, the output tapers can be formed integrally with the solid core 36 of the mixer body, so that the solid core of the mixer body seamlessly extends into the output tapers to provide a continuous pathway for the optical signal, albeit with a converging cross-sectional area in the vicinity of the output tapers.

Figure 2A:
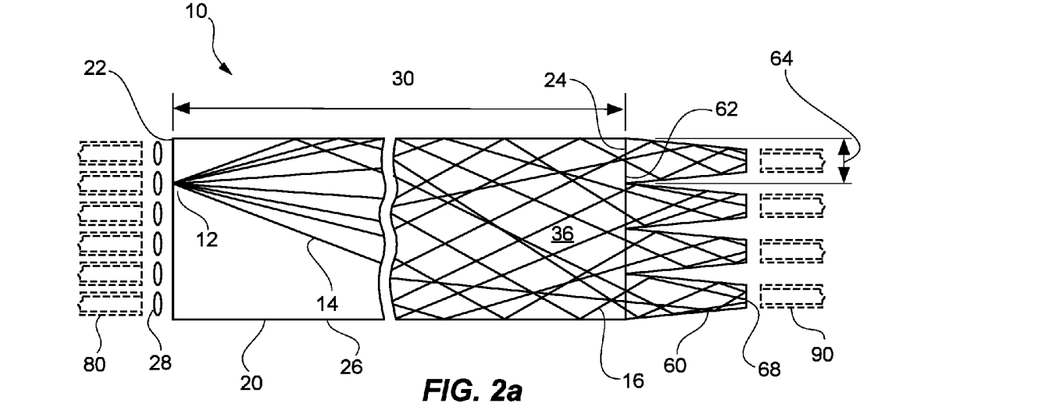
FIG. 2a illustrates a cross-sectional plan view of the embodiment of FIG. 1, taken along section line A-A.
Figure 2B:
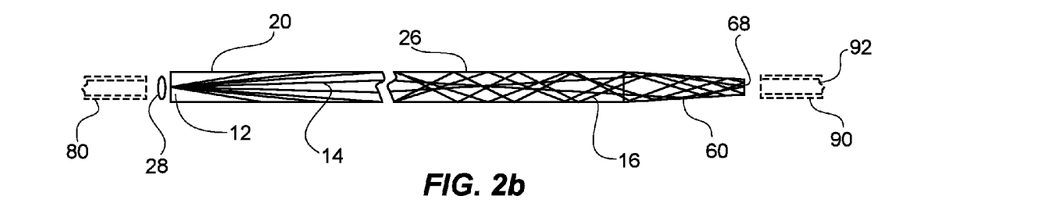
FIG. 2b illustrates a cross-sectional side view of the embodiment of FIG. 1, taken along section line B-B.

FIGS. 2a and 2b together illustrate cross-sectional plan and side views of the embodiment of the multi-channel optical coupler 10 shown in FIG. 1. The optical coupler can generally comprise a mixer body 20 and output tapers 60. As describe above, the mixer body can include an input end 22, an output end 24 and sidewalls 26. A plurality (N) of input channels 80 can be coupled to the optical couple to provide, individually or in combination, one or more optical signals 12 for passage through the optical coupler to the plurality (M) of output tapers 60 and optical channels 90. The number of input channels N can be different than the number of output channels M. Although shown in FIGS. 2a-2b for illustrative purposes with six input channels and four output channels, any combination of input and output channel is possible, and the number of output channels can be more or less than the number of input channels.

A focusing lens 28 or similar device can be used to collimate the light signal 12 and control its numerical aperture prior to its introduction into the mixer body 20. By virtue of the angular divergence of the one or more optical signals 12 and the extended length 30 of the elongate mixer body 20, the initial beam of light 14 can have ample opportunity to contact and reflect off of the sidewalls 26 of the mixer body via total internal reflection, so that the reflected beam of light 16 becomes substantially mixed and diffused across the cross-sectional area of the optical core 36 at the output end 24 of the mixer body. A thin layer of cladding (not shown) can be applied to the sidewalls of the solid core to control the optical indexes along the outer boundary of the mixer body, thereby encouraging total internal reflection of the light signal inside the mixer body and preventing the optical signal from escaping the optical coupler as lost energy.

Upon arrival out the output end 24 of the optical coupler 10, the optical signal can be substantially diffused across the cross-sectional area of the solid optical core 36. From this junction the optical signal will pass into the plurality of optical tapers 60 coupled to or formed with the output end of the mixer body 20. Each of the optical tapers can have a reception area 62 adjacent the output end of the mixer body for receiving a portion of the reflected optical signal 16 that has been transmitted through the mixer body. Each reception area 62 of the output tapers 60 can have a reception area width 64, and the sum of all reception area widths may be equivalent to the overall width 34 of the mixer body. Thus, substantially all of the optical signal 16 arriving at the output end 24 of the mixer body 20 can be collected and gathered into the plurality of output tapers and directed into the output channels 90.

As the output channels 90 can be optical fibers 92 with round optical cores in a representative embodiment, each output taper 60 can also act to gather a portion optical signal 16 from a rectangular reception area 62 and focus the optical energy, with minimal loss, into an optical signal having a circular broadcast area 68. Other cross-sectional shapes and profiles for both the output tapers and output channels are also possible.

Figure 3:
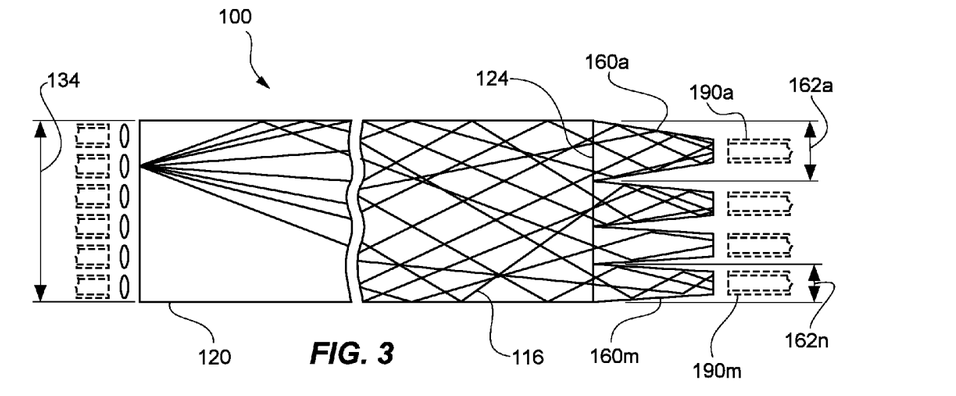
FIG. 3 illustrates a cross-sectional plan view of a multi-channel optical coupler in accordance with another representative embodiment.

Illustrated in FIG. 3 is a cross-sectional plan view of a multi-channel optical coupler 100, in accordance with another representative embodiment, in which output tapers 160a through 160m have reception areas 162a-162m of varying size. Varying the size the reception areas of the output tapers allows one to vary and control the amount of the optical signal received and gathered by each output taper, which is then directed to the various output channels 190a-190m. In the embodiment shown, the size of the reception areas can be varied or adjusted by configuring the reception area widths 162a-162m adjacent the output end 124 of the mixer body 120. Here again, the sum of all reception area widths may be equivalent to the overall width 134 of the mixer body. However, with the reception area width 162a of output taper 160a being larger than the reception area widths of the other output tapers, a proportionately larger fraction of the reflected and diffused optical signal 116 can be collected by output taper 160a, thereby increasing the energy or intensity of the optical signal fed into output channel 190a.

Figure 4:
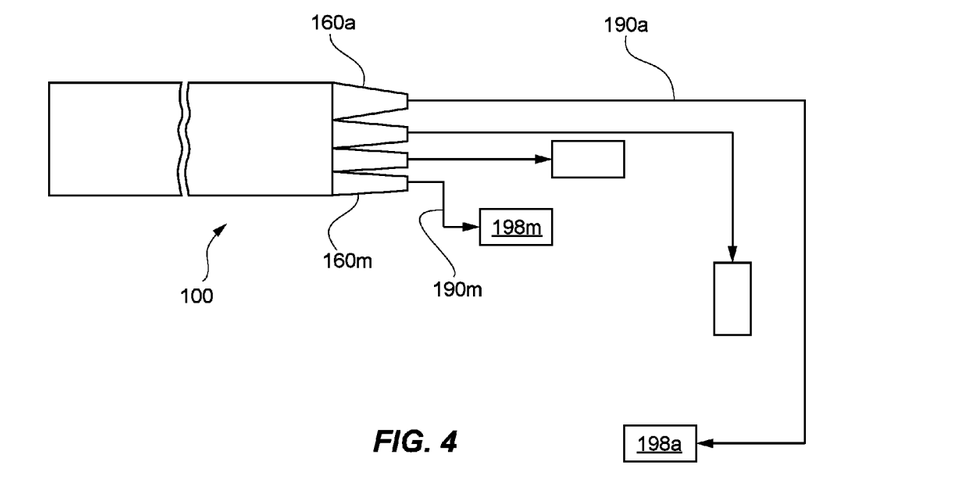
FIG. 4 illustrates a schematic plan view of a multi-channel optical coupler, in accordance with another representative embodiment.

As demonstrated in FIG. 4, the ability to vary or increase the strength of the optical signal entering one output channel verses another output channel can be highly advantageous to a designer of an optical network, as some output detectors 198a can be located at significantly greater distances from the optical coupler 100 than other optical detectors 198m. A stronger output signal can thus be directed via output taper 160a through the output channel 190a having the greatest length or furthest distance to travel, and while a less-intense output signal can be directed via output taper 160m through the output channel 190m to an optical detector 198m that is much closer. Taking into account a constant loss of signal energy per unit of distance traveled, both the more intense and less intense optical signals can arrive at their respective optical detectors with about the same of amount of energy or intensity, allowing for optimal communications performance.

Figure 5A:
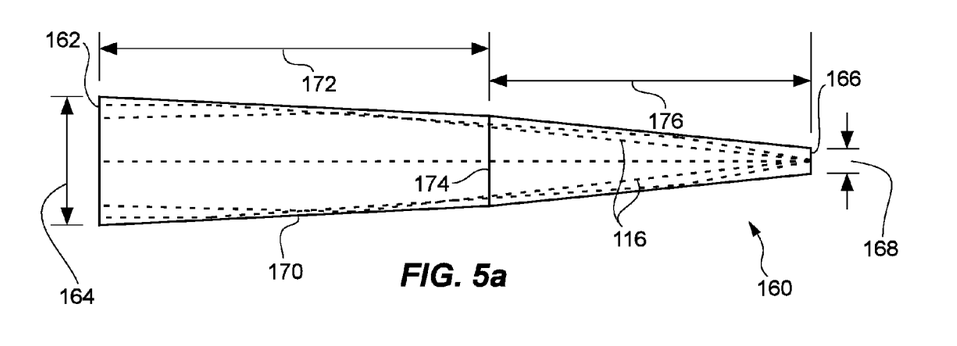
FIG. 5a illustrates a cross-sectional side view of an output taper, in accordance with a representative embodiment.

Illustrated in FIG. 5a is a cross-sectional plan or side view of a converging output taper 160, in accordance with a representative embodiment. As described above, the output taper can include a reception area 162 having a reception area width (or height) 164 adjacent the output end of the mixer body, as well as a broadcast area 166 having a broadcast width (or height or diameter) 168 adjacent and coupled to an output channel. The output taper can further comprise a solid core, output taper body 170 having a smoothly converging or inwardly-sloped outer boundary that provides a converging light passage between the reception area 162 and the broadcast area 166 to increase the coupling efficiency of the optical signal 116 between the mixer body and the output channel.

In one representative embodiment, the converging output taper body 170 can be subdivided into at least two body sections 172, 176 with different slopes or degrees of taper. The differently-sloped body sections 172, 176 can be used to better match the optical impedance (or étendue) of the optical elements and to further improve the coupling efficiency between the optical pathway and the mixer body. It is to be appreciated, moreover, that other converging output taper body configurations are also possible, including straight and continuously-curved output taper embodiments.

In the representative embodiment shown in FIG. 5a, the body section 172 encompassing the reception area can have a 5% taper slope, while the body section 176 encompassing the broadcast area 176 can have a 10% taper slope. For example, if the width 164 (or height) of the reception area were scaled to 50 units, body section 172 given a length of 150 units with at 5% slope, and body section 176 given a length of 125 units at 10% slope, the width 174 (or height) at the mid-span point of inflection would be 35 units while the width 168 (or height) of the broadcast area would be 10 units.

Figure 6:
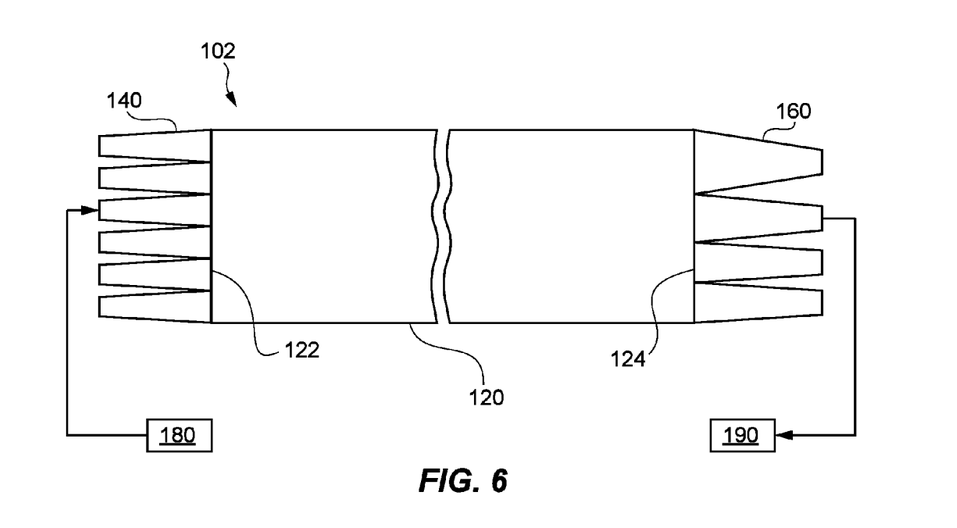
FIG. 6 illustrates a schematic plan view of a multi-channel optical coupler, in accordance with another representative embodiment.

Referring now to FIG. 6, in another representative embodiment of the multi-channel optical coupler 102 diverging input tapers 140 can be provided between the input channels 180 and the input end 122 of the mixer body. The input tapers can better control and guide the optical signal into the mixer body 120, and also can be used convert a circular optical pathway (e.g. from an optical fiber 182) into an optical pathway having a square or rectangular cross-sectional aspect corresponding to a portion of the input end of the mixer body. As with the converging output tapers 160, the diverging input tapers 140 can be separate bodies that are coupled to the input end of the mixer body with an index-matching adhesive, or can be formed integrally with the mixer body, etc.

Figure 5B:
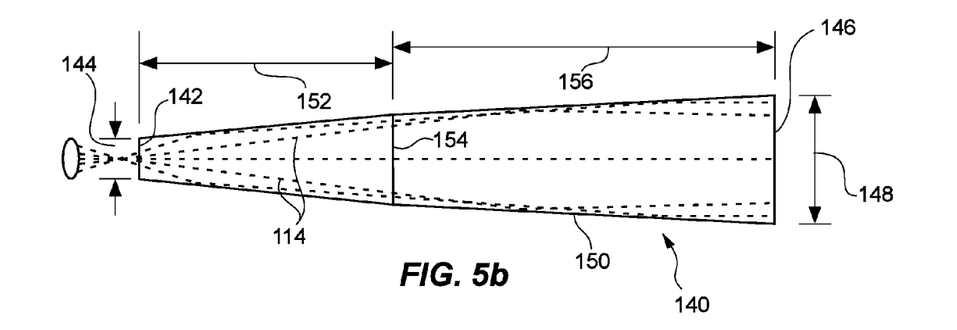
FIG. 5b illustrates a cross-sectional side view of an input taper, in accordance with a representative embodiment.

A cross-sectional plan or side view of a diverging input taper 140 is shown in more detail in FIG. 5b. The input taper can include an entrance area 142 having an entrance area width 144 (or height) adjacent and coupled to an input channel, as well as an exit area 146 having a exit area width 148 (or height or diameter) adjacent the input end of the mixer body for coupling the optical signal 114 into the mixer body. The input taper can further comprise a solid core, input taper body 150 having a smoothly diverging or outwardly-sloped outer boundary that provides a diverging light passage between the entrance area 142 and the exit area 146 to increase the coupling efficiency of the optical signal 114 between the input channel and the mixer body.

In the representative embodiment shown, the diverging input taper body 150 can be subdivided into at least two body sections 152, 156 with different slopes or degrees of taper. Like the output tapers described above, the differently-sloped body sections 152, 156 of the input tapers can be used to better match the optical conductance (or étendue) of the optical elements and to further improve the coupling efficiency between the optical pathway and the mixer body. It is to be appreciated, moreover, that other configurations of the diverging input taper body are also possible, including straight and continuously-curved input taper embodiments, all of which can be considered to fall within the scope.

In a representative embodiment, the body section 152 encompassing the entrance area 142 can have a 10% slope of taper, while the body section 156 encompassing the exit area 146 can have a 5% slope of taper. For example, if the width 124 (or height) of the entrance area were scaled to 15 units, body section 152 given a length of 100 units with a 10% slope, and body section 156 given a length of 150 units at 5% slope, the width 154 (or height) at the mid-span point of inflection would be 35 units while the width 148 (or height) of the exit area would be 15 units.

Referring again to FIG. 6, the plurality of input channels 180 coupled to the input end 122 of the mixer body, with or without the input tapers 140, can include optical fibers, solid-core dielectric wave guides, hollow-core dielectric wave guides, hollow metal waveguides, lasers such as Vertical Cavity Surface-Emitting Lasers (VCSEL), and/or LEDs. Furthermore, the plurality of output channels 190 coupled to the output end 124 of the mixer body through the output tapers 160 can include optical fibers, solid-core dielectric wave guides, hollow-core dielectric wave guides, hollow metal waveguides and/or one or more of the various types of optical detectors known to one of skill in the art.

Figure 7A:
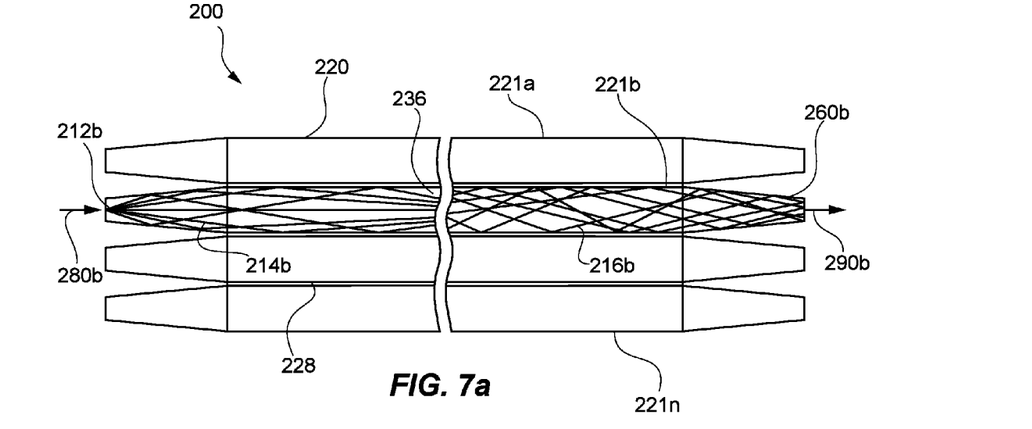
FIG. 7a illustrates a cross-sectional plan view of an optical coupler without an index-matching fluid, in accordance with another representative embodiment.
Figure 7B:
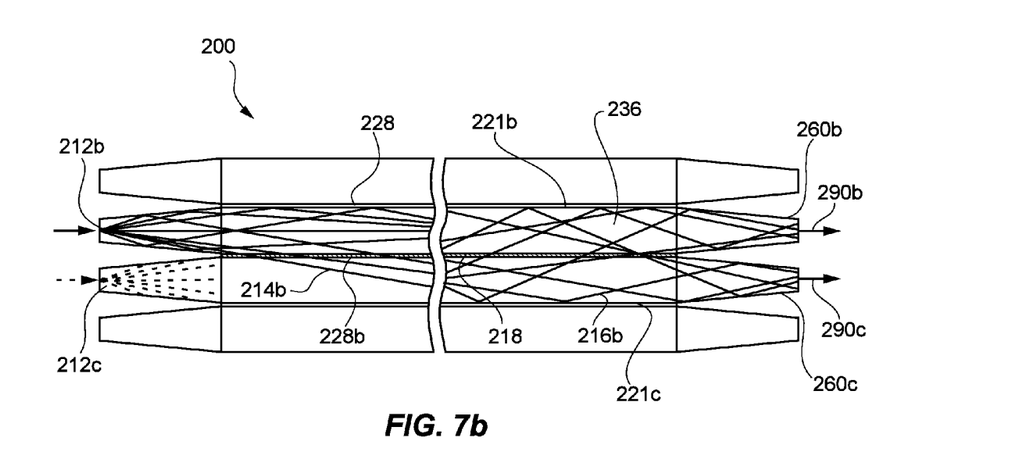

Illustrated in FIGS. 7a and 7b is another representative embodiment of multi-channel optical coupler 200, in which the number (N) of input channels N can equal the number (N) of output channels, and in which the mixer body 220 can be subdivided along the length thereof into elongate subsections 221a-221n separated by one or more fillable gaps 228. In this configuration, any cladding material on the sidewalls of elongate subsections 221a-221n facing the gaps can be eliminated, or a cladding material with an index of refraction that more closely matches that of the core than the cladding material used on other surfaces. In an initial configuration, as shown in FIG. 7a, the one or more fillable gaps 228 can be left empty to form an air gap having an index of refraction that is substantially less than the index of refraction of the solid core 236, thereby encouraging total internal reflection of an optical signals 212b traveling through each elongate subsection 221b so that each of the one or more optical signals remains within that particular elongate subsection 221b. The fillable gaps can also be filled with a material or fluid having an index number that is substantially less than the index of refraction of the solid core. Under this configuration, the optical coupler 200 can provide a 1:1 relationship between each pair of input channels 280b and output channels 290b, and with all of the input portion 214b of the optical signal 112b reaching the output taper 260b as a reflected and diffused optical signal 216b.

Subsequently, as illustrated in FIG. 7b, one or more of the fillable gaps 228 can be filled with an index-matching material 218 or fluid that matches the index of refraction of the subdivided solid core 236, thereby allowing the initial beam of light 214b entering into elongate subsection 221b to pass substantially unhindered across the fillable gap 228b, and to reflect and diffuse through the adjacent elongate subsection 221c as well. Consequently, the input optical signal 212b can then reach two or more output couplers 260b, 260c as a reflected and diffused optical signal 216, which is then gathered into both output channels 290b, 290c in proportion to the size of the reception areas of the two coupled output tapers 260b, 260c.

It is to be appreciated that an additional input optical signal 212c can also be coupled into elongate subsection 221c, which optical signal would also reflected and diffused across both elongate subsections 221c and 221b. The combined and mixed signals from both inputs 212b, 212c would then gathered into both output channels 290b, 290c in proportion to the size of the reception areas of the two coupled output tapers 260b, 260c.

The capability of emptying and filling the fillable gaps 228 with an index matching material 218 to vary the number of output channels receiving the optical signal yields an adjustable and configurable multi-channel optical coupler, so that even though the number of physically-connected input channels may equal the number of physically-connected output channels, the optically-connected input and output channels can be dynamically configured.

Figure 8:
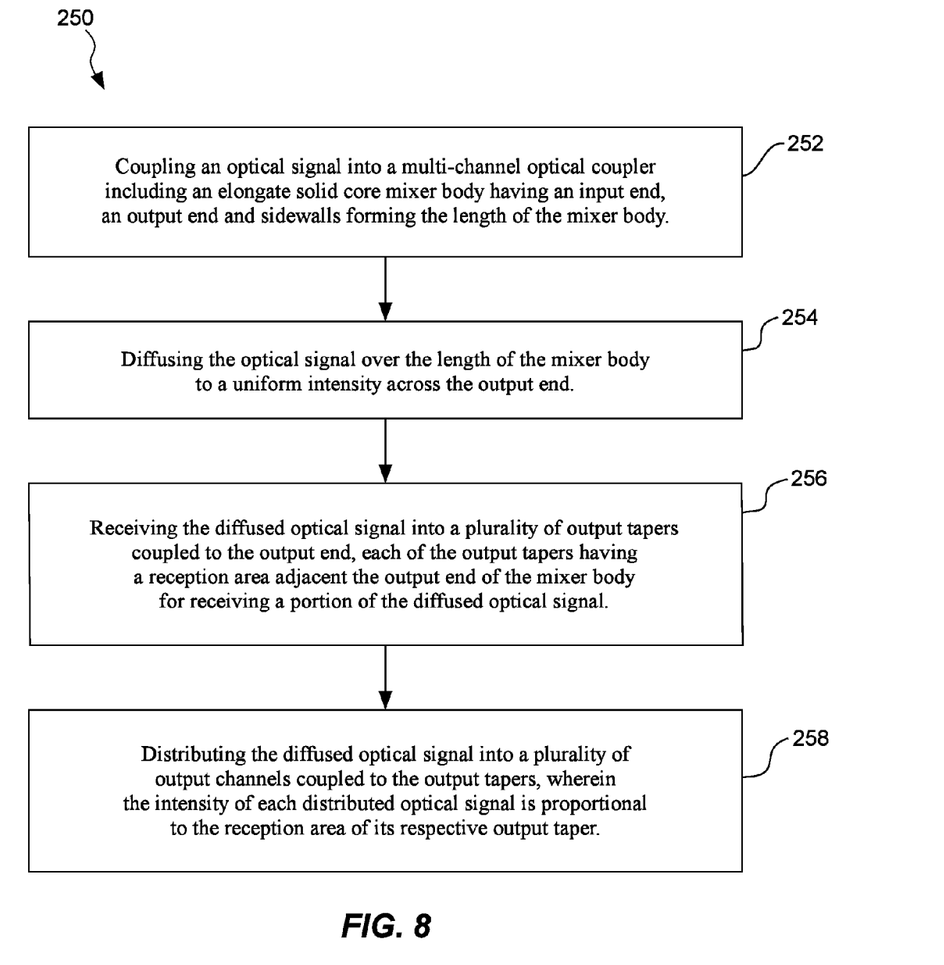
FIG. 8 is a flowchart depicting a method of distributing an optical signal between multiple output channels, in accordance with one representative embodiment.

A method 250 of distributing an optical signal between multiple output channels is depicted in the flowchart of FIG. 8. The method can include the step of coupling 252 an optical signal into a multi-channel optical coupler including an elongate solid core mixer body having an input end, an output end and sidewalls forming the length of the mixer body, and diffusing 254 the optical signal over the length of the mixer body. The method can further include the steps of receiving 256 the diffused optical signal into a plurality of output tapers coupled to the output end, with each of the output tapers having a reception area adjacent the output end of the mixer body for receiving a portion of the diffused optical signal, and distributing 258 the diffused optical signal into a plurality of output channels coupled to the output tapers, wherein the intensity of each distributed optical signal is proportional to the reception area of its respective output taper.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

More specifically, while illustrative representative embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, any steps recited in any method or process claims, furthermore, may be executed in any order and are not limited to the order presented in the claims. The term "preferably" is also non-exclusive where it is intended to mean "preferably, but not limited to." Accordingly, the scope of the invention should be determined solely by the appended claims and their legal equivalents, rather than by the descriptions and examples given above.

What is claimed is:

1. A multi-channel optical coupler comprising:
   an elongate solid core mixer body having an input end, an output end and sidewalls forming a length of the mixer body, the input end configured for receiving at least one optical signal for transmission through the mixer body,
   wherein the length of the mixer body is substantially longer than a cross-sectional height and width of the solid core to diffuse the at least one optical signal transmitted through the mixer body to a uniform intensity across the output end; and
   a plurality of output tapers coupled to the output end, each of the plurality of output tapers including:
   a reception area adjacent the output end of the mixer body for receiving a portion of the at least one optical signal transmitted through the mixer body; and
   wherein a size of the reception area of a first output taper of the plurality of output tapers is different from a size of the reception area of a second output taper of the plurality of output tapers to vary the intensity of the optical signal received by the first output taper as compared with the second output taper.

2. The optical coupler of claim 1, wherein the length of the mixer body ranges between 10 times to 50 times a cross-sectional height or width of the solid core.

3. The optical coupler of claim 1, wherein varying the intensity of the optical signal further comprises increasing the reception area to increase the intensity of the optical signal received by the output taper, and decreasing the reception area to decrease the intensity of the optical signal received by the output taper.

4. The optical coupler of claim 1, wherein each output taper includes:
   a broadcast area substantially smaller in size than the reception area for coupling the received optical signal into an output channel; and
   a converging output taper body having an inwardly-sloped boundary providing a converging light passage between the reception area and the broadcast area, wherein the inwardly-sloped boundary is subdivided into at least two sections with different slopes and a cross-sectional shape of any position along a length of the converging output taper body is substantially the same with a varying diameter.

5. The optical coupler of claim 4, wherein the inwardly-sloped boundary comprises a continuously varying slope.

6. The optical coupler of claim 1, wherein the plurality of output tapers are coupled to the output end with an index-matching adhesive.

7. The optical coupler of claim 1, further comprising a plurality of output channels coupled to the output tapers for receiving the at least one optical signal transmitted through the mixer body.

8. The optical coupler of claim 7, wherein each of the plurality of output channels is selected from the group consisting of optical detectors, optical fibers, solid-core dielectric wave guides, hollow-core dielectric wave guides and hollow-core metal waveguides.

9. The optical coupler of claim 1, further comprising a plurality of input channels coupled to the input end of the mixer body for providing the at least one optical signal.

10. The optical coupler of claim 9, wherein each the plurality of input channels is selected from the group consisting of lasers, LED's, optical fibers, solid-core dielectric wave guides, hollow-core dielectric wave guides and hollow-core metal waveguides.

11. The optical coupler of claim 1, further comprising a plurality of input tapers coupled to the input end of the mixer body, each input taper including:
   an entrance area for receiving an optical signal from an input channel;
   an exit area substantially larger in size than the entrance area and adjacent the input end of the mixer body for coupling the optical signal into the mixer body; and
   a diverging input taper body having an outwardly-sloped boundary providing a diverging light passage between the entrance area and the exit area, wherein the outwardly-sloped boundary is subdivided into at least two sections with different slopes.

12. The optical coupler of claim 11, wherein the outwardly-sloped boundary comprises a continuously varying slope.

13. A multi-channel optical coupler comprising:
   an elongate solid core mixer body having an input end, an output end and sidewalls forming a length of the mixer body, the input end configured for receiving at least one optical signal for transmission through the mixer body,
   wherein the mixer body further comprises a solid core and a cladding layer each formed from an optically translucent material having a index of refraction, the cladding layer index of refraction being substantially less than the core index of refraction to encourage total internal reflection of the at least one optical signal traveling through the solid core of the mixer body; and
   a plurality of output tapers coupled to the output end, each of the plurality of output tapers including:

a reception area adjacent the output end of the mixer body for receiving a portion of the at least one optical signal transmitted through the mixer body; and wherein the reception area is variable to vary the intensity of the optical signal received by each output taper.

14. The optical coupler of claim 13, wherein the cladding layer is formed from an optically opaque material to absorb stray light and minimize cross-talk with an adjacent optical coupler.

15. The optical coupler of claim 13, wherein the solid core of the mixer body is subdivided along the length thereof into elongate sections separated by at least one fillable gap to restrict the passage of the optical signal across the fillable gap.

16. The optical coupler of claim 15, wherein the fillable gap is controllably filled with index-matching liquid matching the core index of refraction to allow the passage of the optical signal across the fillable gap.

17. A method of distributing an optical signal between multiple output channels, comprising:

coupling at least two optical signals into a multi-channel optical coupler including an elongate solid-core mixer body having an input end, an output end and sidewalls forming the length of the mixer body, wherein the length of the mixer body is substantially longer than a cross-sectional height and width of the solid core to diffuse the at least two optical signals transmitted through the mixer body to a uniform intensity across the output end;

diffusing the at least two optical signals over the length of the mixer body to a uniform intensity across the output end;

receiving the at least two diffused optical signals into a plurality of output tapers coupled to the output end, each of the plurality of output tapers having a reception area adjacent the output end of the mixer body for receiving a portion of the diffused optical signals; and distributing the at least two diffused optical signals into a plurality of output channels coupled to the plurality of output tapers, wherein the intensity of each distributed optical signal is proportional to the reception area of its respective output taper.

18. The method of claim 17, further comprising varying the reception areas to vary the intensities of the distributed optical signals output by the plurality of output tapers.

19. The method of claim 18, wherein varying the reception areas further comprises increasing the reception area to increase the intensity of the distributed optical signal received by the output taper, and decreasing the reception area to decrease the intensity of the distributed optical signal received by the output taper.

20. The optical coupler of claim 1, wherein the size of the reception area is proportional to a distance to a detector which receives the optical signal from at least one of the plurality of output tapers.

* * * * *

UNITED STATES PATENT AND TRADEMARK OFFICE
CERTIFICATE OF CORRECTION

| | |
|---|---|
| PATENT NO. | : 8,606,058 B2 |
| APPLICATION NO. | : 12/433794 |
| DATED | : December 10, 2013 |
| INVENTOR(S) | : Huei Pei Kuo et al. |

It is certified that error appears in the above-identified patent and that said Letters Patent is hereby corrected as shown below:

In the Claims

In column 10, line 34, in Claim 10, delete "each" and insert -- each of --, therefor.

Signed and Sealed this
Thirteenth Day of May, 2014

Michelle K. Lee
*Deputy Director of the United States Patent and Trademark Office*